US012810732B2

(12) United States Patent
Grasso et al.

(10) Patent No.: US 12,810,732 B2
(45) Date of Patent: Nov. 24, 2026

(54) SYSTEM FOR MONITORING THE INTEGRITY OF A CONVOY OF VEHICLES AND CORRESPONDING PROCEDURE

(71) Applicant: Faiveley Transport Italia S.P.A., Piossasco (IT)

(72) Inventors: Angelo Grasso, Canelli (IT); Michele Cotza, Turin (IT); Roberto Tione, Lauriano (IT); Matteo Frea, Cantalupa (IT); Luc George Imbert, Turin (IT)

(73) Assignee: FAIVELEY TRANSPORT ITALIA S.P.A., Turin (IT)

( * ) Notice: Subject to any disclaimer, the term of this patent is extended or adjusted under 35 U.S.C. 154(b) by 0 days.

(21) Appl. No.: 18/925,192

(22) Filed: Oct. 24, 2024

(65) Prior Publication Data

US 2025/0131828 A1 Apr. 24, 2025

(30) Foreign Application Priority Data

Oct. 24, 2023 (IT) ........................ 102023000022257

(51) Int. Cl.
*G08G 1/00* (2006.01)
*B60T 7/12* (2006.01)
(Continued)

(52) U.S. Cl.
CPC ................ *G08G 1/22* (2013.01); *B60T 7/124* (2013.01); *B60T 8/1705* (2013.01); *B60T 8/171* (2013.01);
(Continued)

(58) Field of Classification Search
CPC ......... G08G 1/22; B60T 7/124; B60T 8/1705; B60T 8/171; B60T 8/172; B60T 2260/00;
(Continued)

(56) References Cited

U.S. PATENT DOCUMENTS 9,315,173 B1 * 4/2016 Gray ........................ B60T 7/042
9,817,049 B2 * 11/2017 Dome .................. G01R 31/006
(Continued)

FOREIGN PATENT DOCUMENTS

JP H05301568 A * 11/1993
JP 2008029149 A 2/2008
(Continued)

OTHER PUBLICATIONS

"Wang, Yaqin; Automated Disconnected Towing System; May 2020; Department of Computer and Information Technology West Lafayette, Indiana" (Year: 2020).*

*Primary Examiner* — Ramya P Burgess
*Assistant Examiner* — Christopher R Cardimino
(74) *Attorney, Agent, or Firm* — K&L Gates LLP

(57) ABSTRACT

Systems and methods for monitoring the integrity of a convoy of vehicles are described. The convoy can include a first vehicle and at least one second vehicle connected to the first vehicle. In one example, the system can include a communication line and a power supply line each arranged to be installed in the first vehicle and in the at least one second vehicle. The system can further include a control circuit arranged to verify whether the communication line is interrupted and verify whether the power supply line is interrupted. From the verifications, the control circuit may determine that both the communication line and the power supply line are interrupted and further determine that the second vehicle has disconnected from the first vehicle.

9 Claims, 6 Drawing Sheets

(51) Int. Cl.

| | |
|---|---|
| ***B60T 8/17*** | (2006.01) |
| ***B60T 8/171*** | (2006.01) |
| ***B60T 8/172*** | (2006.01) |
| ***B61L 15/00*** | (2006.01) |

(52) U.S. Cl.
CPC .......... *B60T 8/172* (2013.01); *B61L 15/0054* (2013.01); *B60T 2260/00* (2013.01); *B60T 2270/414* (2013.01)

(58) Field of Classification Search
CPC ........... B60T 2270/414; B61L 15/0054; B61L 15/0036; B61L 15/0027; B61L 15/0081; B61L 15/0072; H04L 67/12; B61G 5/10; B61H 9/00; H04B 3/46; H04B 3/60
See application file for complete search history.

(56) References Cited

U.S. PATENT DOCUMENTS

| | | | | |
|---|---|---|---|---|
| 10,850,715 | B1 * | 12/2020 | Decker, Jr. | B60T 8/1708 |
| 11,007,875 | B2 * | 5/2021 | Kodama | B60L 53/14 |
| 11,862,904 | B2 * | 1/2024 | Khamis | B60D 1/28 |
| 11,938,766 | B2 * | 3/2024 | Brickley | B60W 50/0098 |
| 12,344,241 | B2 * | 7/2025 | Zwegers | B60W 30/06 |
| 2005/0017856 | A1 * | 1/2005 | Peterson | B60Q 1/305 340/431 |
| 2009/0072956 | A1 * | 3/2009 | Kalous | B60Q 1/305 340/687 |
| 2012/0187905 | A1 | 7/2012 | Kanayama | |
| 2015/0306928 | A1 * | 10/2015 | McCollum | B60T 17/22 340/431 |
| 2020/0172060 | A1 * | 6/2020 | Decker, Jr. | B60T 17/22 |
| 2023/0096878 | A1 * | 3/2023 | Thomason | B60L 53/16 320/109 |
| 2023/0311597 | A1 * | 10/2023 | McKibben | B60L 50/66 280/432 |

FOREIGN PATENT DOCUMENTS

| | | | | |
|---|---|---|---|---|
| JP | 2012168922 A | | 9/2012 | |
| JP | 2018014805 A | | 1/2018 | |
| KR | 20140000433 A | | 1/2014 | |
| WO | WO-2023086357 A2 | * | 5/2023 | B60T 8/323 |

* cited by examiner

SYSTEM FOR MONITORING THE INTEGRITY OF A CONVOY OF VEHICLES AND CORRESPONDING PROCEDURE

CROSS-REFERENCE TO RELATED APPLICATIONS

This application claims priority to and the benefit of Italian Application No. 102023000022257, filed Oct. 24, 2023, the entire disclosure of which is hereby incorporated by reference herein.

TECHNICAL FIELD

The present invention is generally in the field of the convoys of vehicles; in particular, the invention relates to a system for monitoring the integrity of a convoy of vehicles, particularly a railway convoy, and a corresponding method.

RELATED ART

Presently, there is an increasing need for digitization of convoys of vehicles, such as freight cars.

Digitization is necessary in order to increase the competitiveness of the convoy of vehicles in relation to other modes of transport.

As may be seen in FIG. 1, digitization has required the presence of a power line 100 and a communication line 102 along the vehicles V1, V2 of a convoy.

By convoy of vehicles is meant a plurality of vehicles interconnected with each other.

For example, the vehicles of a convoy may comprise:

a first vehicle V1, such as a locomotive; and at least one second vehicle V2, such as for example one or more towed vehicles connected to the lead vehicle.

In the related art, the power line and/or communication line may be used to determine the composition of the convoy of vehicles. These solutions allow the migration from manual visual verifications to automated processes.

Usually, the detection of the composition of the convoy of vehicles is guided by control means installed in the first vehicle, e.g. in the lead vehicle, or by control means installed on the ground. The detected composition of the convoy of vehicles may be compared with an expected composition of the convoy of vehicles.

This formal verification is of great importance in order to know the length of the convoy of vehicles and the braking capacity of the convoy of vehicles. This verification is also mandatory for the convoy of vehicles to enter into service on the main network.

The at least one second vehicle V2 and the first vehicle V1 may each comprise coupling means, such as for example an automatic digital coupler.

In general, an automatic digital coupler is capable of remotely decoupling the at least one second vehicle V2 from the convoy for maneuvering operations. The command request may be sent for example by the control means installed in the first vehicle V1 or by the control means on the ground.

When the automatic digital coupler of one vehicle is in the coupling state with an automatic digital coupler of another vehicle, a valve element coupled to a main pipe (brake pipe) of the vehicle may be brought into an open condition, which allows the braking fluid (e.g., pressurized air) to flow from one vehicle to another. When the automatic digital coupler of one vehicle is in the decoupled state, i.e. is not coupled to an automatic digital coupler of another vehicle, the valve element coupled to the main pipe (brake pipe) of the vehicle may be brought into a closed condition, isolating the main pipe installed in such a vehicle.

Due to the design of the automatic digital couplers, the normal operational decoupling process provides for the simultaneous decoupling on both of the coupled automatic digital couplers, which allows wear on the automatic digital couplers to be minimized.

Disadvantageously, it is sufficient for an automatic digital coupler to assume the decoupling condition in order to have effective decoupling.

The first vehicle V1 may request the decoupling of the at least one second vehicle V2 comprised in the convoy of vehicles, which means that control means of the at least one second vehicle may perform decoupling actions of the automatic coupler under the management thereof.

Since it is sufficient for only one automatic digital coupler to be in a decoupling condition in order to achieve an effective decoupling of the vehicle, and since the coupling or decoupling condition of the valve element of an automatic coupler, associated with the main pipe, is linked to the coupling/decoupling condition of the automatic digital coupler, a single fault may lead to a situation in which there is an undue decoupling of the at least one second vehicle V2, resulting in the breaking up in two of the railway convoy, with a portion of the convoy of vehicles not able to be braked.

The situation is therefore as follows: in the event of undue decoupling by an automatic coupler of the at least one second vehicle V2, this at least one second decoupled vehicle V2 will be separated from the original convoy of vehicles, and the valve element of the second vehicle disconnected from the convoy of vehicles, associated with the main pipe, is brought to the closed state in the automatic digital coupler, assuming the decoupling state. Therefore, the at least one second separated vehicle V2 will not be able to perform braking, as the main pipe will remain pressurized due to the closure of the valve element. In this circumstance, the at least one second vehicle disconnected from the railway convoy may move freely, and in an uncontrolled manner, since the possibility of performing braking will not be ensured.

SUMMARY OF THE INVENTION

One object of the present invention is to provide solutions which allow a situation in which at least one vehicle of the convoy of vehicles has unduly disconnected from the convoy to be promptly identified.

A further object of the present invention is to provide solutions which make it possible to ensure that, should at least one vehicle disconnect from the convoy of vehicles, it is still possible to brake the at least one vehicle disconnected from the convoy.

The aforesaid and other objects and advantages are achieved, according to an aspect of the invention, by a system for monitoring the integrity of a convoy of vehicles and, according to a further aspect of the invention, by a method for monitoring the integrity of a convoy of vehicles, having the features defined in the claims.

BRIEF DESCRIPTION OF THE DRAWINGS

The functional and structural features of some preferred embodiments of a system for monitoring the integrity of a convoy of vehicles and a corresponding method according to the invention will now be described. Reference is made to the accompanying drawings, wherein.

DETAILED DESCRIPTION

Figure 1:
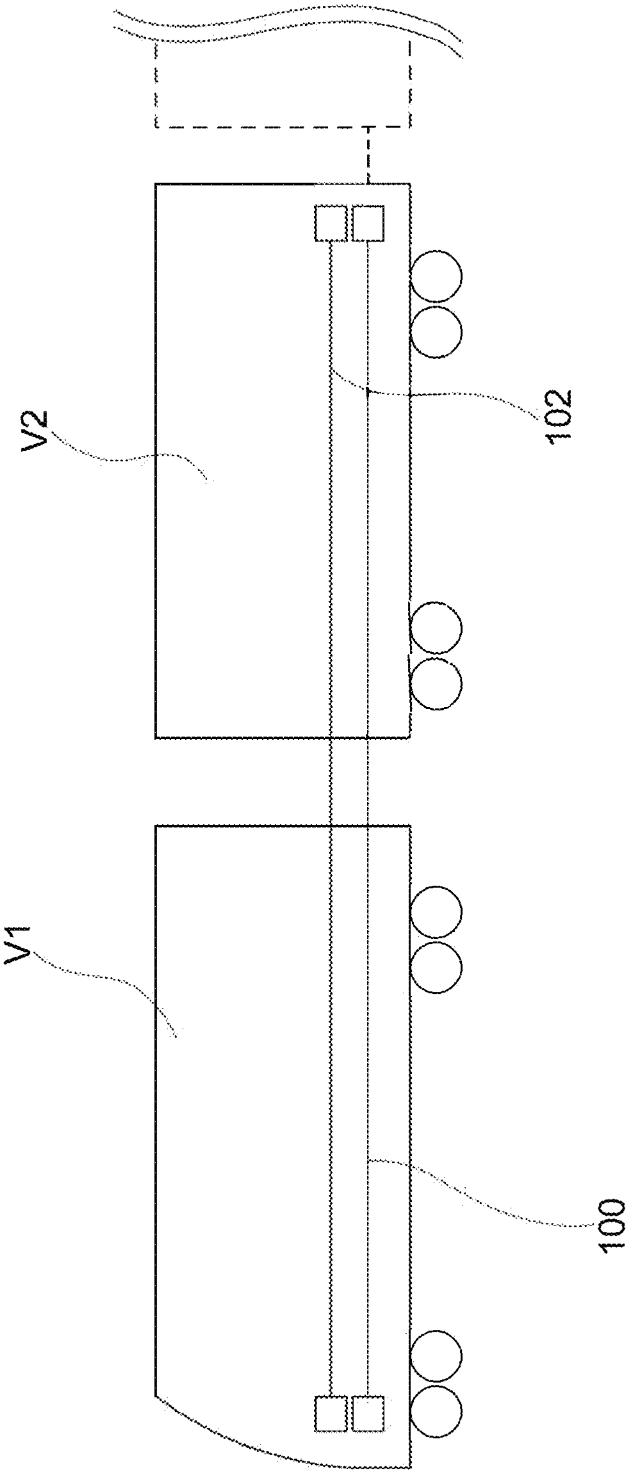
FIG. 1 shows an exemplary convoy according to the prior art.

Before explaining in detail a plurality of embodiments of the invention, it should be clarified that the invention is not limited in the application thereof to the design details and configuration of the components presented in the following description or shown in the drawings. The invention may assume other embodiments and be implemented or constructed in practice in different ways. It should also be understood that the phraseology and terminology have a descriptive purpose and should not be construed as limiting. The use of “include” and “comprise” and the variations thereof are intended to cover the elements set out below and the equivalents thereof, as well as additional elements and the equivalents thereof.

Figure 2:
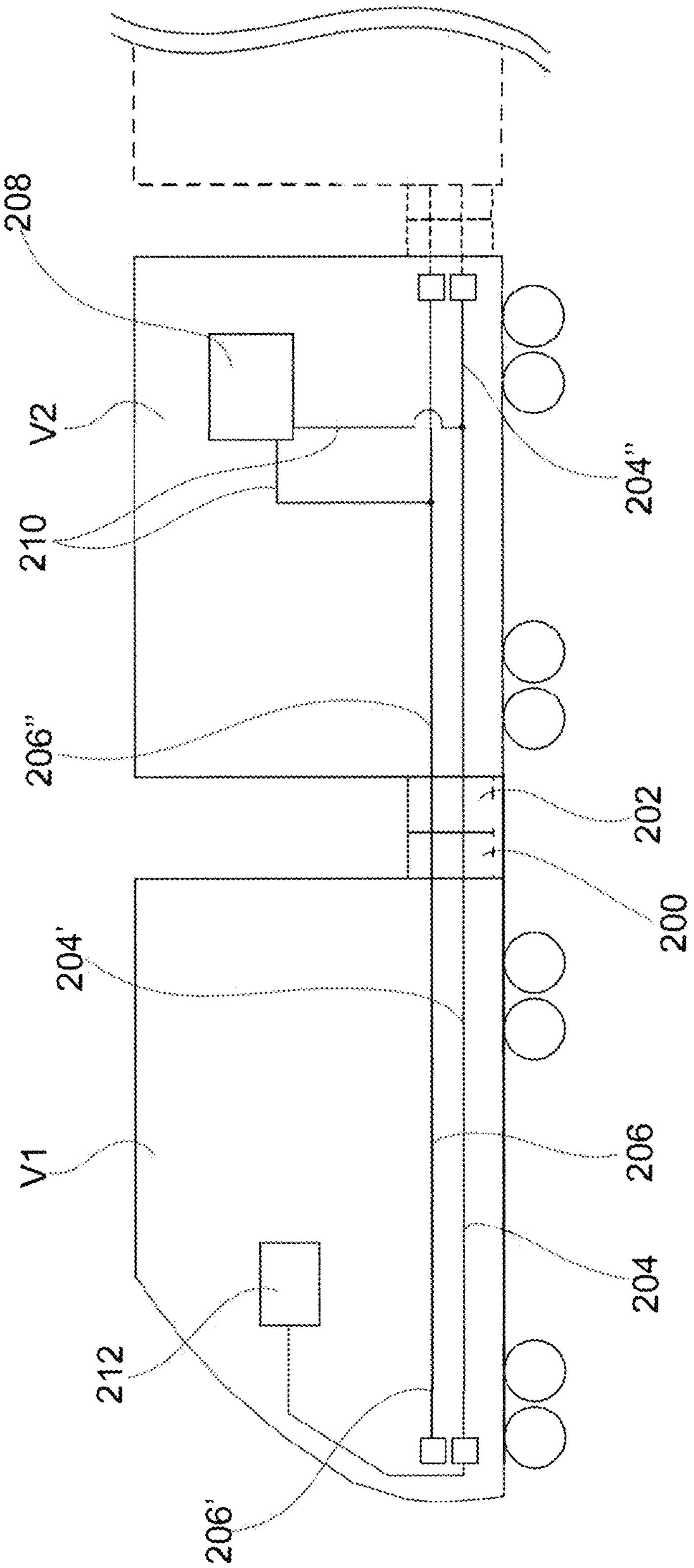
FIG. 2 shows a first embodiment of a system for monitoring the integrity of a convoy of vehicles according to the present invention.

Referring initially to FIG. 2, the following describes a first embodiment of a system for monitoring the integrity of a convoy of vehicles, particularly a railway convoy.

The convoy of vehicles comprises a first vehicle V1 and at least one second vehicle V2, connected to said first vehicle V1.

As may be seen, for example, in the figures, the first vehicle V1 and the at least one second vehicle V2 may be connected so as to be connected in series with each other.

For example, the first vehicle V1 may comprise first coupling means 200 and the second vehicle may comprise second coupling means 202. In this case, to connect the vehicles, the first coupling means 200 may be connected to the second coupling means 202. In one example, the first coupling means 200 may be arranged to be installed at a first end of the first vehicle, and the second coupling means may be arranged to be installed at a first end of the second vehicle.

For example, the first coupling means 200 and the second coupling means 202 may each be or comprise an automatic digital coupler.

Furthermore, the convoy of vehicles comprises a communication line 204, arranged to be installed in said first vehicle V1 and in said at least one second vehicle V2, and a power supply line 206, arranged to be installed in said first vehicle V1 and in said at least one second vehicle V2.

For example, the power supply line 206 may be an analog power line or a digital power line. Or, preferably, the power supply line 206 may be a safety circuit. For example, in the railway industry, the safety circuit is also known as the “safety loop”.

For example, the power supply line 206 may comprise a first power line segment 206', installed in the first vehicle and connected to the first coupling means, and a second power line segment 206", installed in the second vehicle and connected to the second coupling means.

In this way, when the first vehicle V1 is connected to the second vehicle V2 via the first coupling means 200 and the second coupling means 202, the first power line segment 206' and the second power line segment 206" may be connected via said first coupling means 200 and the second coupling means 202 so as to have an electrical connection between the two power line segments 206', 206".

For example, the first power line segment 206' of the first vehicle V1 may be powered by a power supply means. For example, the power supply means may be a pantograph arranged to draw energy from a catenary. When the first power line segment 206' and the second power line segment 206" are connected via said first coupling means 200 and the second coupling means 202, the electrical power supplied by the power supply means to the first power line segment 206' may also be transmitted in the second power line segment 206", thus powering the second vehicle V2.

For example, the communication line 204 may comprise a first communication line segment 204' installed in the first vehicle and connected to the first coupling means, and a second communication line segment 204" installed in the second vehicle and connected to the second coupling means.

In this way, when the first vehicle V1 is connected to the second vehicle V2 via the first coupling means 200 and the second coupling means 202, the first communication line segment 204' and the second communication line segment 204' may be connected via said first coupling means 200 and the second coupling means 202 so as to have a communication channel between the two communication line segments 204', 204".

For example, the communication line 204 may be of the “Single Pair Ethernet” type.

Preferably, the power supply line 206 and the communication line 204 may be a “powerline” arranged to allow the conveyance of a power supply and communication messages/signals.

Preferably, the power supply line 206 and the communication line 204 may be redundant.

The system for monitoring the integrity of a convoy of vehicles comprises electronic control means 208 arranged to be installed in the second vehicle V2. These electronic control means 208 are further arranged to verify whether the communication line 204 is interrupted and to verify whether said power supply 206 is interrupted.

The electronic control means 208 are further arranged to determine that said second vehicle V2 has disconnected from said first vehicle V1, when, from the verifications, they determine that both the communication line 204 and said power supply line 206 are interrupted.

In other words, the electronic control means 208 are able to determine that there is no longer a connection between the first vehicle V1 and the second vehicle V2.

For example, the electronic control means 208 may be or comprise at least one of: a computer, a controller, a processor, a microprocessor, a microcontroller, a PLC, an FPGA, and the like.

For example, the system for monitoring the integrity of a convoy of vehicles may further comprise an internal bus 210 arranged to allow the transfer of information from the power line 206 and/or the communication line 204 to the electronic control means.

In the railway industry, for example, the electronic control means 208 may be implemented according to a safety integrity level SIL>3, or the electronic control means 208 may comprise at least two control sub-modules, and each control sub-module may be implemented according to a safety integrity level SIL>=2.

For example, the first vehicle V1 of the convoy may be a lead vehicle, and the second vehicle V2 may be a towed vehicle connected to said lead vehicle, or vice versa. In a further example, the first vehicle V1 of the convoy may be a first towed vehicle, and the second vehicle V2 may be a second towed vehicle, connected to said first vehicle V1.

Preferably, the system for monitoring the integrity of a convoy of vehicles may comprise current sensor means arranged to be installed in said second vehicle and to measure a current value flowing in the power supply line.

In such a case, the electronic control means 208 may be arranged to determine that the power supply line 206 is interrupted when the current value measured by the current sensor means is zero or less than a predetermined current threshold.

For example, the current sensor means may comprise or be an amperometer.

In particular, considering the first power line segment 206' and the second power line segment 206" of the power supply line, the current sensor means may be arranged to measure a current value flowing in the second power line segment 206" of the power supply line.

Preferably, the system for monitoring the integrity of a convoy of vehicles may comprise voltage sensor means arranged to be installed in said second vehicle V2 and to measure a voltage value of said power supply line 206.

In such a case, the electronic control means 208 may be arranged to determine that the power supply line 206 is interrupted when the voltage value measured by the voltage sensor means is zero or less than a predetermined voltage threshold.

For example, the voltage sensor means may comprise or be a voltmeter.

In particular, considering the first power line segment 206' and the second power line segment 206" of the power supply line, the current sensor means may be arranged to measure a voltage value of said second power line segment 206" of the power supply line.

Preferably, the electronic control means 208 may be arranged to determine that the communication line 204 is interrupted when, via said communication line, the electronic control means 208 do not receive, for at least a predetermined verification period, at least one communication message transmitted by second electronic control means 212 arranged to be installed in the first vehicle V1.

The second electronic control means 212 may be arranged to transmit communication messages, via said communication line, according to a predetermined transmission period. Each communication message may be varied in content, in order to be able to verify that there are no communication errors or any malfunctions of the various electronic control means.

In other words, the electronic control means 208 may determine that the communication line 204 is interrupted when they are unable to receive, for at least a predetermined verification period, the communication messages transmitted by second electronic control means 212 installed in the first vehicle V1.

For example, the second electronic control means 212 may be or comprise at least one of: a computer, a controller, a processor, a microprocessor, a microcontroller, a PLC, an FPGA, and the like.

Figure 3:
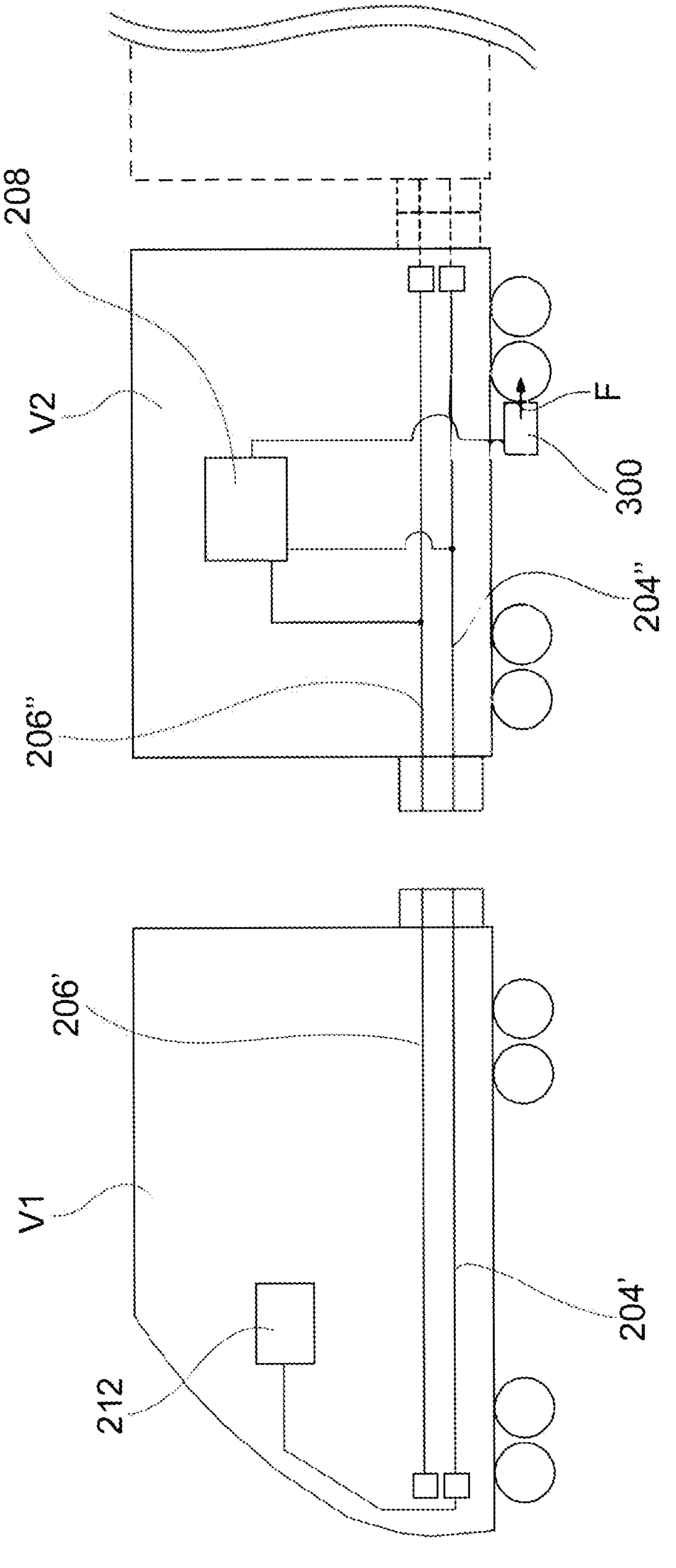
FIG. 3 shows a further embodiment of a system for monitoring the integrity of a convoy of vehicles according to the present invention.

Preferably, as may be observed in FIG. 3, when the electronic control means 208 determine that the second vehicle V2 has disconnected from the first vehicle V1, the electronic control means 208 may further be arranged to actuate braking means 300 of the second vehicle V2 of the convoy of vehicles.

For example, the braking means 300 may be pneumatic, electropneumatic, mechanical, electromechanical, electrodynamic.

For example, the braking means 300 may be arranged to generate a braking force F on at least one wheel or on at least one axle or on at least one braking member coupled to a wheel or an axle of the second vehicle.

For example, when the braking means 300 are pneumatic or electropneumatic, the convoy of vehicles may comprise a main pipe arranged to convey a braking fluid. In this case, the braking means 300 may be arranged to receive the braking fluid conveyed by the main pipe and use this braking fluid to generate a braking force.

For example, the first coupling means 200 of the first vehicle V1 may comprise first pneumatic connection means, and the second coupling means 202 of the second vehicle V2 may comprise second pneumatic connection means. In this case, a first segment of the main pipe may be installed in the first vehicle and be connected to the first pneumatic connection means, and a second segment of the main pipe may be installed in the second vehicle and be connected to the second pneumatic connection means.

When the first coupling means 200 are connected to the second coupling means 202, the first pneumatic connection means will in turn be connected to the second pneumatic connection means so that the second segment of the main pipe is connected to the first segment of the main pipe. On the other hand, when the second coupling means are disconnected from the first coupling means, for example due to the disconnection of the second vehicle V2 from the first vehicle V1, the first pneumatic connection means are disconnected from the second pneumatic connection means so that the second segment of the main pipe is disconnected from the first segment of the main pipe.

The first pneumatic connection means may be associated with first pneumatic control means, and the second pneumatic connection means may be associated with second pneumatic control means.

When the first coupling means 200 are connected to the second coupling means 202, the first pneumatic control means and the second pneumatic control means may assume a state that allows the passage of the braking fluid between the first segment of the main pipe and the second segment of the main pipe.

On the other hand, when the second coupling means are disconnected from the first coupling means, for example due to the disconnection of the second vehicle V2 from the first vehicle V1, the first pneumatic control means and the second pneumatic control means may assume a state that prevents the passage of the braking fluid between the first segment of the main pipe and the second segment of the main pipe.

Figure 4:
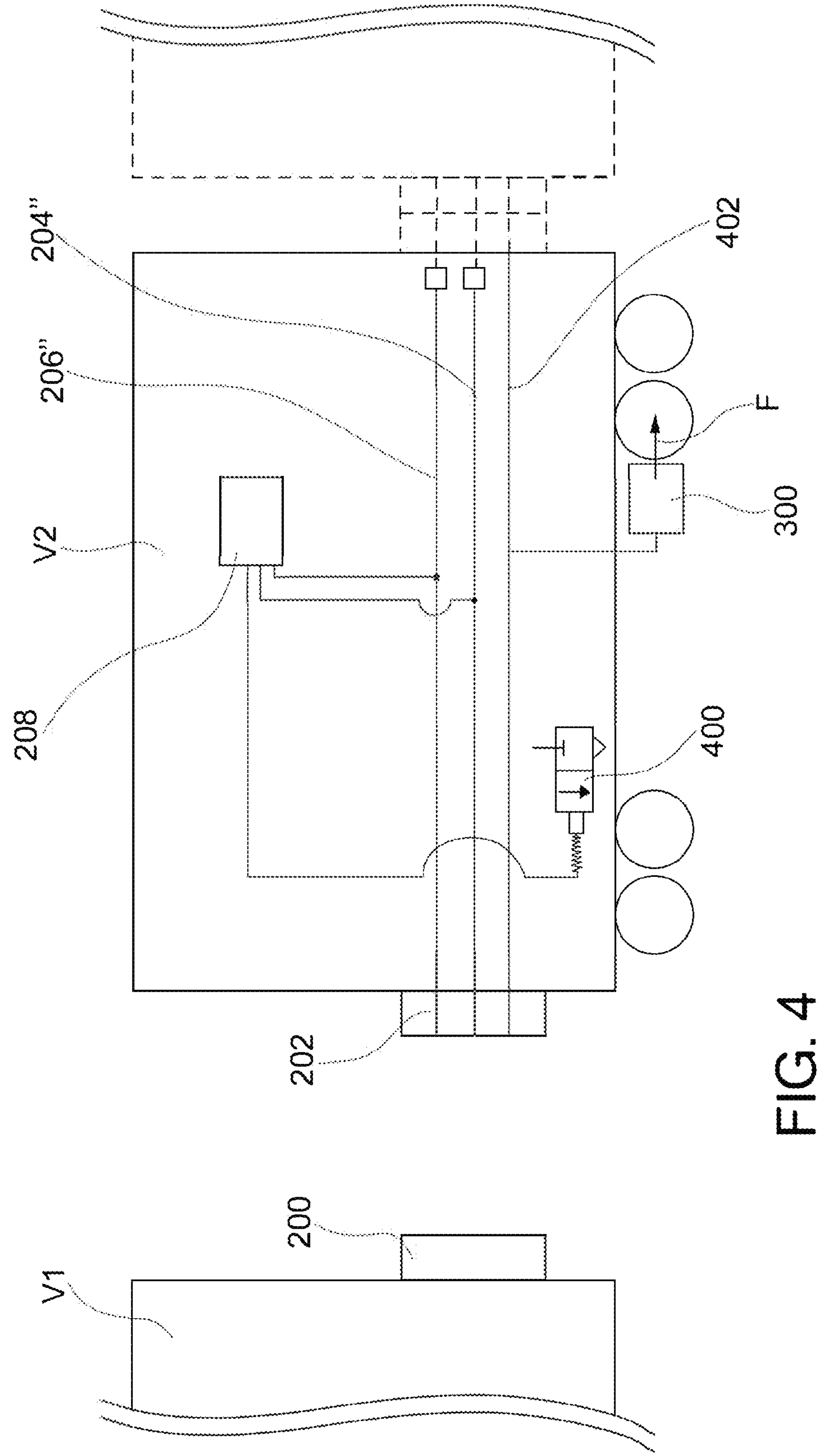
FIG. 4 shows a still further embodiment of a system for monitoring the integrity of a convoy of vehicles according to the present invention.

In a further example, as may be seen in FIG. 4, the system for monitoring the integrity of a convoy of vehicles may preferably comprise at least one valve element 400. In this case, the electronic control means 208, for operating the braking means 300, may be arranged to control the valve element 400 so as to discharge the braking fluid from the second segment of the main pipe 402 to the atmosphere.

Figure 5:
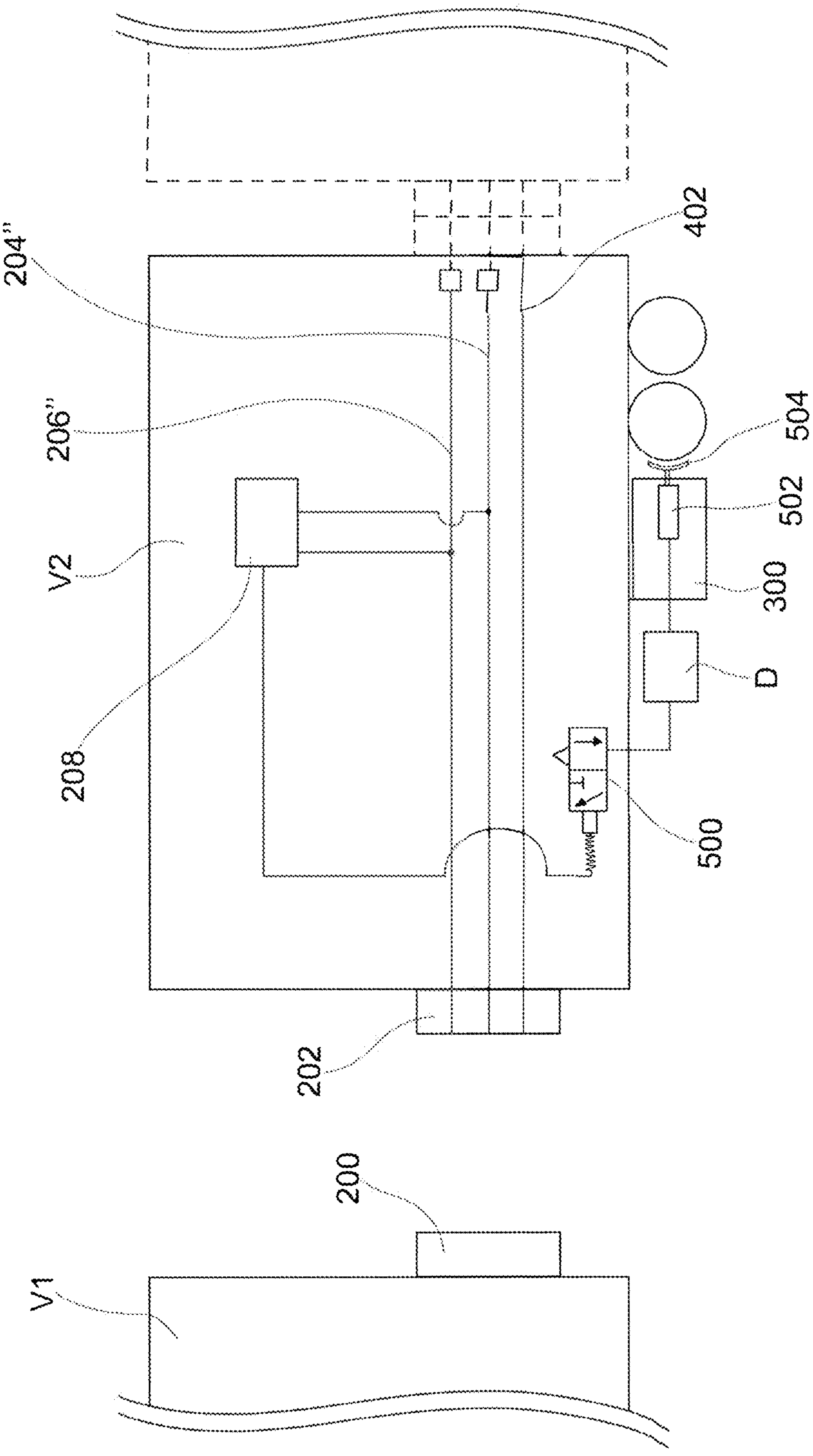
FIG. 5 shows a still further embodiment of a system for monitoring the integrity of a convoy of vehicles according to the present invention.

In a still further example, as may be seen in FIG. 5, preferably, the system for monitoring the integrity of a convoy of vehicles may comprise:

- braking fluid distribution means D connected to the second segment of the main pipe 402 through at least one valve element 500;
- a braking cylinder 502 arranged to receive the braking fluid from the braking fluid distribution means D;
- braking application means 504 arranged to generate the braking force F, wherein the value of the braking force is a function of the braking fluid comprised in the brake cylinder 502.

In this case, the electronic control means 208, for operating the braking means, may be arranged to control the valve element 500 so as to discharge the braking fluid to the atmosphere before it reaches the braking fluid distribution means D.

Figure 6:
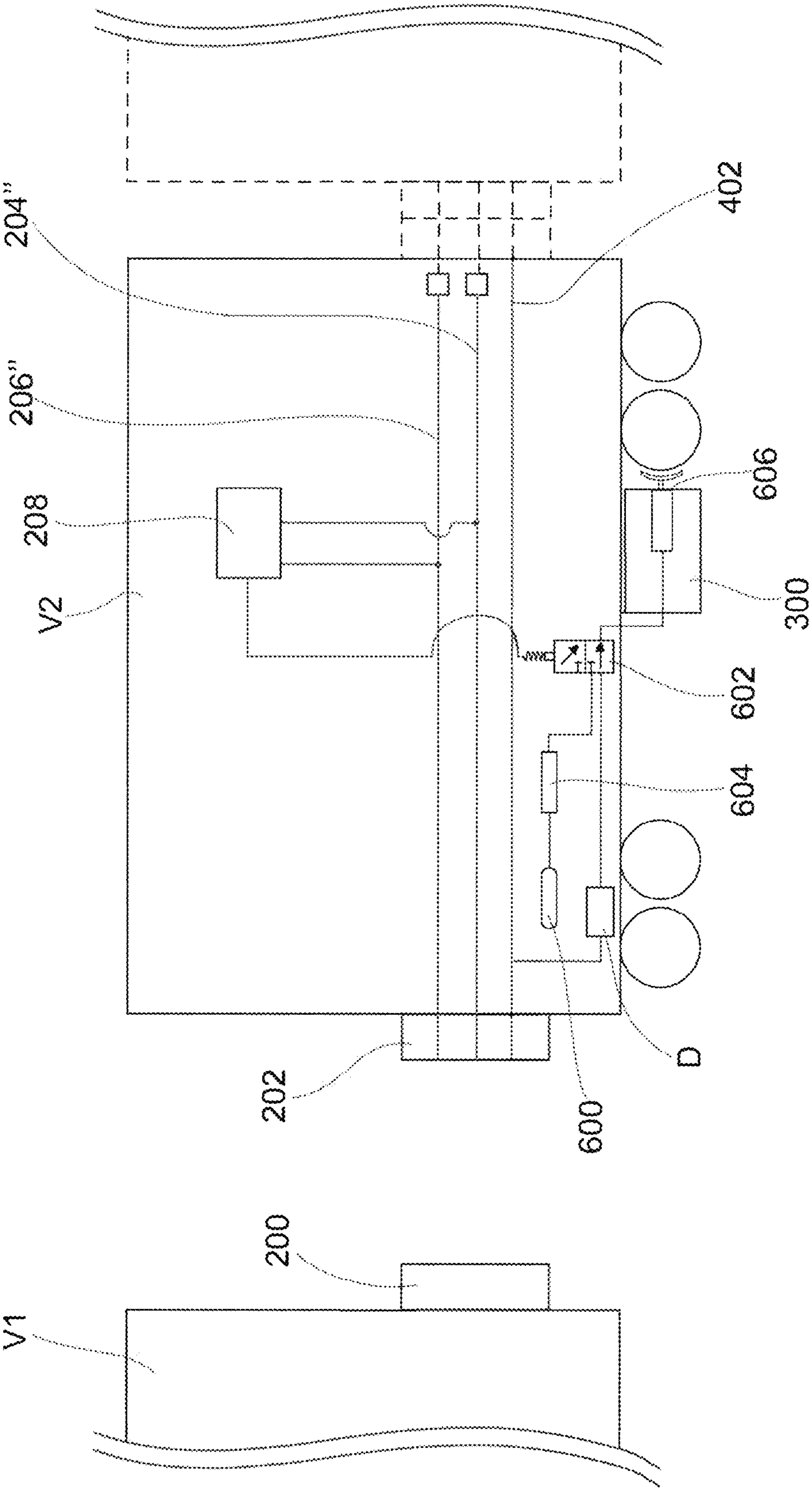
FIG. 6 shows a still further embodiment of a system for monitoring the integrity of a convoy of vehicles according to the present invention.

In a still further example, as may be seen in FIG. 6, preferably, the system for monitoring the integrity of a convoy of vehicles may comprise:

- braking fluid distribution means D connected to the second segment of the main pipe;
- an auxiliary reservoir 600 arranged to store the braking fluid;
- a valve element 602 arranged to receive braking fluid from the braking fluid distribution means and braking fluid from the auxiliary reservoir, and to supply at the outlet, selectively, braking fluid from said braking fluid distribution means D or braking fluid from the auxiliary reservoir 602;
- a braking cylinder arranged to receive the braking fluid from the valve element;
- braking application means 606 arranged to generate the braking force, wherein the value of the braking force is a function of the braking fluid comprised in the brake cylinder.

The valve element may be arranged to normally supply braking fluid from the braking fluid distribution means at the outlet.

The electronic control means 208, for operating the braking means, may be arranged to control the valve element 602 so as to supply the braking fluid coming from the auxiliary reservoir to the outlet of the valve element.

Preferably, the braking means may further comprise braking control means 604 arranged to regulate the pressure of the braking fluid coming from the auxiliary reservoir before said braking fluid is supplied to the valve element.

Preferably, the electronic control means 208 may be arranged to actuate the braking means 300 of the second vehicle of the convoy of vehicles so as to perform at least one of:

- an emergency braking;
- a service braking;
- a parking braking.

Preferably, the electronic control means 208 may be further arranged to:

- when, from the verifications, the electronic control means 208 determine that the communication line 204 is interrupted but that said power supply line 206 is not interrupted, generate a communication failure alarm signal.

For example, the electronic control means 208 may be arranged to transmit the communication failure alarm signal to additional ground control means via wireless communication means or to second electronic control means 212 of the first vehicle via second back-up communication means.

Preferably, the electronic control means 208 may be further arranged to:

- when, from the verifications, the electronic control means 208 determine that the communication line 204 is not interrupted but that said power supply line 206 is interrupted, generate a power failure alarm signal.

For example, the electronic control means 208 may be arranged to transmit the power failure alarm signal to additional ground control means via wireless communication means or to second electronic control means 212 of the first vehicle V1 via the communication line 204.

The fact that at least one of the communication line 204 and the power supply line 206 is not interrupted is an indication that the vehicles V1 and V2 are still connected and only a failure or malfunction of the communication line 204 or of the power supply line has occurred.

Otherwise, the situation in which both the communication line 204 and the power supply line 206 are interrupted must be assessed as the vehicles V1 and V2 being disconnected.

Preferably, the electronic control means 208 may be arranged to be powered by local power supply means arranged to be installed in the second railway vehicle.

For example, the local power supply means may be or comprise at least one battery.

In this way, even if the electronic control means 208 do not receive power from the power supply line 206, their operation may be ensured by the power supply provided by the local power supply means.

If there is a plurality of second vehicles V2 connected in series with each other, each second vehicle V2 may comprise respective electronic control means 208.

In a further aspect, the present invention relates to a method for monitoring the integrity of a convoy of vehicles, particularly a railway convoy.

Also in this case, the convoy comprises:

- a first vehicle and at least one second vehicle, connected to said first vehicle;
- a communication line arranged to be installed in said first vehicle and said at least one second vehicle;
- a power supply line arranged to be installed in said first vehicle and said at least one second vehicle.

In one embodiment, the method for monitoring the integrity of a convoy of vehicles comprises the following steps implemented by electronic control means installed in the second vehicle of the convoy:

- verify if the communication line is interrupted;
- verify if the power supply line is interrupted;
- when, from the verifications, it is determined that both the communication line and said power supply line are interrupted, determine that said second vehicle has disconnected from said first vehicle.

The embodiments described above for the system for monitoring the integrity of a convoy of vehicles and not repeated here may clearly also be applied similarly to the method.

An advantage achieved by the present invention is to have provided solutions which allow a situation wherein at least one vehicle of the convoy of vehicles has unduly disconnected from the convoy to be promptly identified.

An additional advantage achieved is to have provided solutions which allow, should at least one vehicle disconnect from a further vehicle in the convoy of vehicles, the possibility that the at least one vehicle disconnected from the convoy may still be braked.

Various aspects and embodiments of a system for monitoring the integrity of a convoy of vehicles and a corresponding method according to the invention have been described. It is understood that each embodiment may be combined with any other embodiment. Moreover, the invention is not limited to the embodiments described, but may be varied within the scope defined by the appended claims.

The invention claimed is:

1. A system for monitoring an integrity of a convoy of vehicles, wherein said convoy comprises:
- a first vehicle and at least one second vehicle connected to said first vehicle;
- a communication line arranged to be installed in said first vehicle and said at least one second vehicle;
- a power supply line arranged to be installed in said first vehicle and said at least one second vehicle;
- wherein said system for monitoring the integrity of the convoy of vehicles comprises a control circuit arranged to be installed in said second vehicle;
- wherein a control circuit is further arranged to:
- verify whether said communication line is interrupted;
- verify whether said power supply line is interrupted;
- based at least in part on the verifications, determine that both the communication line and the power supply line are interrupted and further determine that said second vehicle has disconnected from said first vehicle; and
- based on determining said second vehicle has disconnected from said first vehicle, actuate a brake of said second vehicle of said convoy of vehicles.

2. The system according to claim 1, comprising a current sensor arranged to be installed in said second vehicle and to measure a current value flowing in said power supply line;
- wherein said control circuit is arranged to determine that said power supply line is interrupted when the current value measured by said current sensor is zero or less than a predetermined current threshold.

3. The system according to claim 1, comprising voltage sensor means arranged to be installed in said second vehicle and to measure a voltage value of said power supply line;
- wherein said control circuit is arranged to determine that said power supply line is interrupted when the voltage value measured by said voltage sensor means is zero or below a predetermined voltage threshold.

4. The system according to claim 1, a control circuit is arranged to determine that said communication line is interrupted when, via said communication line, said control circuit did not receive, for at least a predetermined verification period, at least one communication message transmitted by a second control circuit arranged to be installed in said first vehicle.

5. The system according to claim 1, wherein said control circuit is arranged to actuate the brake of said second vehicle of the convoy of vehicles so as to perform at least one of:
- an emergency braking;
- a service braking;
- a parking braking.

6. The system according to claim 1, wherein said control circuit is further arranged to:
- based at least in part on the verifications, determine that the communication line (204) is interrupted but that said power supply line is not interrupted and further generate a communication failure alarm signal.

7. The system according to claim 1, wherein said control circuit is further arranged to:
- based at least in part on the verifications, determine that the communication line (204) is not interrupted but that said power supply lines interrupted and further generate a power failure alarm signal.

8. The system according to claim 1, wherein said control circuit is arranged to be electrically powered by a local power supply arranged to be installed in said second vehicle.

9. A method for monitoring an integrity of a convoy of vehicles, wherein said convoy comprises:
- a first vehicle and at least one second vehicle connected to said first vehicle;
- a communication line arranged to be installed in said first vehicle and said at least one second vehicle;
- a power supply line arranged to be installed in said first vehicle and said at least one second vehicle;
- wherein said method for monitoring the integrity of the convoy of vehicles comprises:
- verifying, by a control circuit, whether said communication line is interrupted;
- verifying, by the control circuit, whether said power supply line is interrupted;
- determining, by the control circuit based on the verifications, that both the communication line and the power supply line are interrupted;
- determining, by the control circuit, that said second vehicle has disconnected from said first vehicle, and
- based on determining said second vehicle has disconnected from said first vehicle, actuating, by the control circuit, a brake of said second vehicle of said convoy of vehicles.

* * * * *